(12) United States Patent
Howard, Jr. et al.

(10) Patent No.: US 7,935,647 B2
(45) Date of Patent: May 3, 2011

(54) LAMINATES OF ACID POLYSACCHARIDE FILMS

(75) Inventors: Edward George Howard, Jr., Hockessin, DE (US); Nicole M. Reinartz, Wilmington, DE (US); Rachel Kahn, Wilmington, DE (US); Ronald James McKinney, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 824 days.

(21) Appl. No.: 11/611,486

(22) Filed: Dec. 15, 2006

(65) Prior Publication Data

US 2008/0146109 A1 Jun. 19, 2008

(51) Int. Cl.
*B32B 27/12* (2006.01)

(52) U.S. Cl. ........................................ 442/394; 442/399

(58) Field of Classification Search .................. 442/394, 442/399
See application file for complete search history.

(56) References Cited

U.S. PATENT DOCUMENTS

| | | | |
|---|---|---|---|
| 3,389,549 A | | 6/1968 | David |
| 3,567,632 A | | 3/1971 | Richter et al. |
| 4,595,708 A | | 6/1986 | Sundet |
| 4,957,795 A | * | 9/1990 | Riedel .............................. 428/74 |
| 5,559,205 A | | 9/1996 | Hansen et al. |
| 5,607,765 A | | 3/1997 | Hansen et al. |
| 5,676,964 A | | 10/1997 | Della Valle et al. |
| 6,175,054 B1 | * | 1/2001 | Jacques ........................... 602/48 |
| 6,746,762 B1 | * | 6/2004 | Hosoda et al. ................ 428/332 |
| 2004/0081781 A1 | | 4/2004 | Corby et al. |
| 2004/0248486 A1 | | 12/2004 | Hodson |
| 2005/0133035 A1 | | 6/2005 | Yahiaoui et al. |

FOREIGN PATENT DOCUMENTS

| | | | |
|---|---|---|---|
| EP | 0 698 635 A | | 2/1996 |
| JP | 2003236987 | * | 8/2003 |
| WO | 2005/052500 A | | 6/2005 |

OTHER PUBLICATIONS

Cohen et. al., Coating Processes, Kirk-Othmer Encyclopedia of Chemical Technology, 2004, vol. 7:1-35.
H.F. Mark et. al., Ionic Polymers, Encyclopedia of Polymer Science and Technology, $2^{nd}$ Edition, vol. 8:393-396, 1962.
Z.M. Huang et. al., A Review on Polymer Nanofibers by Electrospinning and Their Applications in Nanocomposites, Composites Science and Technology, 2003, vol. 63:2223-2253.
S. Brzezinski et. al., Structure and Properties of Microporous Polyurethane Membranes Designed for Textile-Polymeric Composite Systems, Fibres & Textiles in Eastern Europe, 2005, vol. 13:53-58.
National Institute of Justice, Law Enforcement and Corrections Standards and Testing Program, Guide for the Selection of Chemical and Biological Decontamination Equipment for Emergency First Responders, NIJ Guide, 2001, vol. 1:103-00.
International Search Report for International Application No. PCT/US2006/047980 dated May 19, 2008.

* cited by examiner

*Primary Examiner* — Lynda Salvatore (57) ABSTRACT

The present invention relates to a laminate prepared in part from a continuous acid polysaccharide film. In various embodiments, the laminate is useful for fabrication as a protective article as it typically is largely impermeable to hazardous chemical and biological agents, but is sufficiently permeable to water vapor that, if worn as protective apparel, it is both protective and comfortable to wear.

25 Claims, 1 Drawing Sheet

FIG 1

LAMINATES OF ACID POLYSACCHARIDE FILMS

FIELD OF THE INVENTION

The present invention relates to laminates prepared in part from continuous films comprising an acid polysaccharide. In various embodiments, the laminates are useful for fabrication as a protective article and are preferably substantially impermeable to hazardous chemical and biological agents, but sufficiently permeable to water vapor that, if worn as protective apparel, it is both protective and comfortable to wear.

BACKGROUND

There is a growing need for structures that provide personal protection against toxic chemical and biological agents. It is known to devise structures that are impermeable to toxic chemical vapors and liquids, but, when used as apparel, such structures are typically also hot, heavy and uncomfortable to wear.

The degree of comfort offered by apparel worn as a protective suit is significantly affected by the amount of water vapor that can permeate through the fabric from which the suit is made. The human body continuously perspires water as a method for controlling body temperature. When a protective fabric hinders the loss of water vapor from the body, the transpirational cooling process is hindered, which leads to personal discomfort. When a protective suit allows little or no loss of water vapor, extreme heat stress or heat stroke can result in a short period of time. Hence, it is desirable that, in addition to offering the highest levels of protection against toxic chemicals and liquids, a practical chemical and biological protective suit should have high water vapor transmission rates. It is also desirable that the appropriate protective structure be light in weight and offer the same high level of protection over a long period of time.

In co-pending U.S. patent application Ser. No. 11/593,598 selectively permeable laminates are provided that comprise a continuous chitosan film. The laminates allow moisture vapor transport while providing a barrier to the permeation of chemical and biological substances that can be harmful to human health.

The present invention provides selectively permeable laminates that contain continuous films of acid polysaccharides and that can be used in articles for personal protection, providing improved wearer comfort compared with impermeable articles.

SUMMARY OF THE INVENTION

One aspect of the present invention is a method of inhibiting the permeation of a chemically or biologically harmful agent through a laminate or a structure or item of apparel fabricated therefrom, by including within the laminate a continuous acid polysaccharide film.

Another aspect of the present invention is a protective structure comprising a continuous acid polysaccharide film. In some embodiments, the structure is a laminate further comprising at least one layer of fabric.

A further aspect of the present invention is a finished article incorporating a laminate that comprises a continuous acid polysaccharide film and at least one layer of fabric. Finished articles include items of apparel, shelters, and protective covers.

A further aspect of the present invention is a process for fabricating a selectively permeable laminate, comprising:
(a) forming a solution of an acid polysaccharide,
(b) depositing a quantity of the acid polysaccharide solution sufficient to form a film on a substrate, wherein the substrate is essentially without protrusions above the plane of the substrate that are higher than the desired thickness of the coating of chitosan that will be transformed into the film;
(c) drying the deposited acid polysaccharide solution on the substrate, thereby forming a continuous acid polysaccharide film;
(d) optionally, depositing an additional layer onto the acid polysaccharide film; and
(e) forming a laminate comprising the substrate and the acid polysaccharide film and at least one layer of fabric.

Another aspect of the present invention is a process for fabricating a selectively permeable laminate, comprising:
(a) forming a solution of an acid polysaccharide;
(b) depositing on a work device a quantity of such solution sufficient to form a film;
(c) drying the deposit of chitosan solution on the work device, thereby forming a continuous acid polysaccharide film;
(d) optionally, depositing an additional layer onto the acid polysaccharide film;
(e) removing the film from the work device; and
(f) forming a laminate comprising the film and at least one layer of fabric.

These and other aspects of the present invention will be apparent to one skilled in the art in view of the following description and the appended claims.

DETAILED DESCRIPTION

In the context of this disclosure, a number of terms shall be utilized.

The term "film" as used herein means a thin but discrete structure that moderates the transport of species in contact with it, such as gas, vapor, aerosol, liquid and/or particulates. A film may be chemically or physically homogeneous or heterogeneous. Films are generally understood to be less than about 0.25 mm thick.

The term "sheet" or "sheeting" as used herein means a film that is at least 0.25 mm thick.

The term "acid polysaccharide" as used herein means both (1) a polysaccharide that contains acidic functional groups that are ionizable and (2) a salt of such a polysaccharide.

The term "acid polysaccharide film" as used herein means a film that contains at least one acid polysaccharide moiety in the amount of at least 50% by weight.

The term "nonporous" as used herein denotes a material or surface that does not allow the passage of air other than by molecular diffusion.

The term "continuous functionalized polysaccharide film" as used herein means an acid polysaccharide film having at least one nonporous surface.

The term "permeable" as used herein means allowing the passage of liquids or gases.

The term "selectively permeable" as used herein means allowing passage of certain species but acting as a barrier to others.

The term "laminate" as used herein means a material comprising two or more parallel layers of material that are at least partially bonded to each other.

The term "substrate" as used herein means the material onto which a film is formed from solution.

The term "work device" as used herein denotes a substrate which is used only for film formation and does not subsequently become part of a laminate.

The term "soluble" as used herein denotes a material that forms a visibly transparent solution when mixed with a specified solvent. For example, a water-soluble material forms a transparent solution when mixed with water, while a water-insoluble material does not.

The term "acid polysaccharide solution" as used herein indicates that at least one acid polysaccharide moiety is dissolved in the indicated solvent. However, materials that are insoluble in the indicated solvent may also be present.

The term "(in)solubilize" as used herein means to render a material (in)soluble in a specified solvent.

The term "crosslinking" as used herein means the creation of bonds, i.e. crosslinks, between polymer chains. Crosslinks may be ionic bonds, covalent bonds, or hydrogen bonds.

The term "chitosan" as used herein includes chitosan-based moieties including chitosan itself, chitosan salts, and chitosan derivatives.

The term "harmful to human health" as used herein means causing injury to humans as a consequence of acute or chronic exposure through dermal contact, ingestion, or respiration.

In preferred embodiments, the acid polysaccharide films and laminates made therefrom are substantially impermeable to certain biological and/or chemical agents. It is often desirable that the films and laminates be at least 99% impermeable to certain agents, even up to 100% impermeable.

In one embodiment, the present invention provides a protective structure, fabricated from a continuous acid polysaccharide film or a selectively permeable laminate containing a continuous acid polysaccharide film. "Structure", as used herein with regard to structures fabricated from the continuous acid polysaccharide film, includes single layers and multiple layers of continuous acid polysaccharide films. Acid polysaccharide films can be used to make laminates. The structures can be used in articles and items of apparel that protect against exposure to a chemical or biological agent that is harmful to human health. Specific embodiments include finished articles, including articles of apparel, fabricated from a continuous acid polysaccharide film or a selectively permeable laminate containing a continuous acid polysaccharide film.

In other embodiments, the invention provides methods of inhibiting the permeation of a chemically or biologically harmful agent through a selectively permeable laminate, or through an article or item of apparel fabricated therefrom, by including within the selectively permeable laminate a continuous acid polysaccharide film.

In further embodiments the invention provides methods of fabricating a structure that protects against exposure to a chemical or biological agent that is harmful to human health, and methods of fabricating items of apparel, by incorporating into a structure or item of apparel a selectively permeable laminate containing an acid polysaccharide film.

Because the laminates are selectively permeable, we have found that a structure fabricated therefrom provides a protective barrier that inhibits the permeation through the laminate, and thus through the structure, of chemical and biological agents that may be harmful to humans while maintaining sufficient water vapor permeability to maintain personal comfort when the laminate is used to fabricate an item of apparel.

Figure 1:
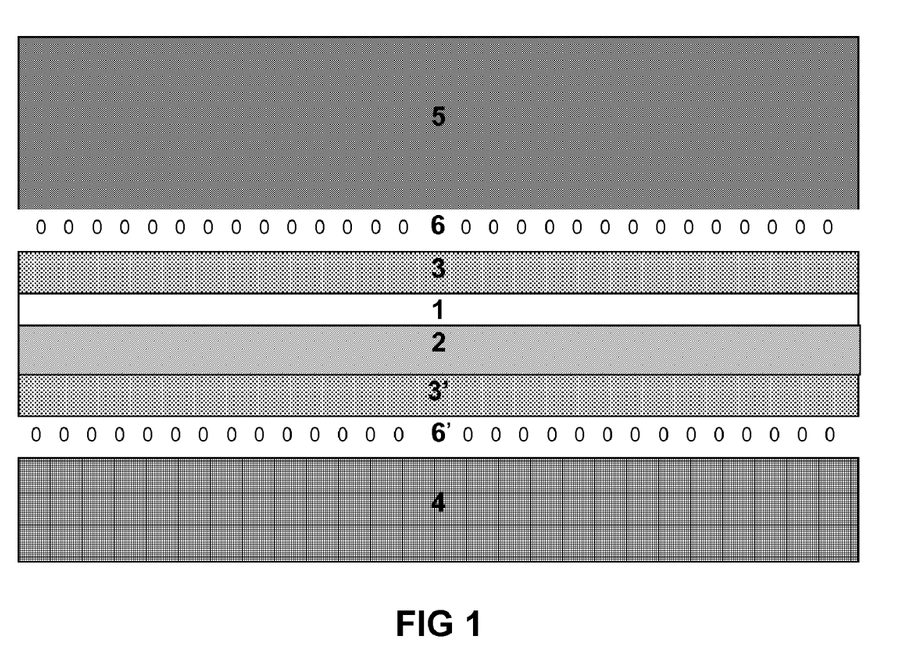
FIG. 1 is a schematic diagram showing the structure of one type of selectively permeable laminate according to an embodiment of the present invention.

The selectively permeable laminates described herein contain a continuous acid polysaccharide film. In one embodiment, the laminate is an acid polysaccharide film deposited from solution onto a substrate. In another embodiment, the laminate is an acid polysaccharide film adhered to a layer, for example, polyurethane film, by thermal bonding. In another embodiment, a continuous acid polysaccharide film or an acid polysaccharide film cast onto a substrate, or an acid polysaccharide film thermally bonded to another layer is bonded to one or more layers of fabric, by adhesive. The adhesive can be in the form of stripes or, preferably, dots, to provide a discontinuous layer of adhesive, in order not to block passage of gases and/or liquids through the selectively permeable laminate. FIG. 1 illustrates one embodiment of a selectively permeable laminate that could be used in, for example, an article of apparel. In the embodiment shown, the laminate contains the following elements: a continuous acid polysaccharide film (1); a substrate to which the continuous acid polysaccharide film is adhered (2); additional layers (3, 3'); an inner liner (4); an outer shell (5) and adhesive (6,6'). However, not all embodiments of the selectively permeable laminates contain all of the elements shown in FIG. 1.

Continuous Acid Polysaccharide Film

The acid polysaccharides used in the films are distinguished from simple polysaccharides, such as cellulose and dextrin (starch), in that the acid polysaccharides have acidic functional groups that are ionizable in water (for example, —COOH and —SO$_3$H), in addition to the hydroxy and acetal groups traditionally associated with polysaccharides. Examples include but are not limited to pectin, alginic acid, propylene glycol alginate, carboxymethylcellulose, xanthan, gum arabic, gum karaya, psyllium, xylan, arabic acid, tragacanth acid, khava gum, linseed acid., celluronic acid, lichenin uronic acid, gellan gum, rhamsan gum, welan gum, carrageenan, glycosaminoglycans (e.g., hyaluronic acid, chondroitin-4-sulfate, chondroitin-6-sulfate, dermatan sulfate, keratin sulfate, and heparin); and alkali, alkaline earth, and alkyl(ammonium) salts of these. Typically, the acid polysaccharide has a molecular weight of at least about 3,000 and the molecular weight can be as high as about 10,000,000 or more.

Where the acid form of an acid polysaccharide is insoluble in water, as in the case of alginic acid and carboxymethylcellulose, the films may be cast from a soluble salt form of the acid polysaccharide, for example, an alkali salt (e.g., sodium alginate) or an (alkyl)ammonium salt form.

The appropriate concentration of acid polysaccharide in the casting solution will vary depending on how the solution is to be applied, and also on the molecular weight of the acid polysaccharide, as a lower concentration may be desired for a relatively high molecular weight acid polysaccharide. Different application methods work best with solutions of different viscosities, but typically, the solution will contain from about 0.5 to about 15 wt % acid polysaccharide.

The solution from which the film is prepared may include, in addition to acid polysaccharide, inorganic fillers, including without limitation, glass spheres, glass bubbles, clays (e.g., sepiolite, attapulgite, and montmorillonite) and the like. Small amounts of such fillers, preferably less than 10 wt %, can be used to increase thermal stability and modulus of the acid polysaccharide film where this is desirable.

The acid polysaccharide solution from which the film is prepared may include additives such as natural polymers, synthetic polymers, crosslinking agents, fillers, flame retardants, plasticizers, tougheners, and stabilizers, to enhance various properties of the acid polysaccharide film, such as strength, flexibility, shrinkage upon drying, fire resistance and stability. A typical additive that is a natural polymer is chitosan. Chitosan is the commonly used name for poly-[1-4]-β-D-glucosamine. It is commercially available and is chemically derived from chitin, which is a poly-[1-4]-β-N-acetyl-D-glucosamine that, in turn, is derived from the cell walls of fungi, the shells of insects and, especially, crustaceans. Chitosan-based moieties that are suitable for use as additives in the present invention include chitosan itself, chitosan salts, and chitosan derivatives. Representative examples of chitosan derivatives suitable for use in this invention include N- and O-carboxyalkyl chitosan.

The additives are present at less than 50% by weight, based on the weight of acid polysaccharide plus additives.

Such additives may be soluble in the solution, or they may be present as dispersed insoluble material. The solution may include one or more water-soluble polymers as additives to enhance desirable properties, such as polyvinyl alcohol to enhance flexibility. A polymer with basic functional groups, such as chitosan or polyethyleneimine, could be added to react with the acid form of an acid polysaccharide to form an insoluble salt.

An acid polysaccharide film may be prepared by casting an acid polysaccharide solution directly onto a substrate that will be incorporated along with the film into a laminate. Alternatively, the acid polysaccharide solution may be cast onto a work device such as a smooth surface, such as glass or a polymer film (for example, polyester film). If the film is cast onto a work device, the film is then dried, detached and then incorporated into a laminate in a separate step.

The solution may be applied to a substrate by any of a variety of methods known in the art. For a small scale process, such as a laboratory test sample, the solution is typically applied using a doctor knife. Methods available to coat planar surfaces, which have irregular surfaces, include without limitation spray coating, dip coating, and spin coating. In a commercial process, the solution could be applied to, e.g., traveling web using methods that include without limitation reverse roll, wire-wound or Mayer rod, direct and offset gravure, slot die, blade, hot melt, curtain, knife over roll, extrusion, air knife, spray, rotary screen, multilayer slide, coextrusion, meniscus, comma and microgravure coating. These and other suitable methods are described by Cohen and Gutoff in "Coating Processes" in the *Kirk-Othmer Encyclopedia of Chemical Technology* [John Wiley & Sons, 5$^{th}$ edition (2004), Volume 7, Pages 1-35]. The method chosen will depend on several factors, such as the rheology of the solution to be applied, the desired wet film thickness, the speed of a substrate that is traveling, and the required coating accuracy as a percent of total thickness.

The applied solution is then dried by any suitable means known in the art such as exposure to a hot air oven, air impingement drying, or radiative (e.g. infrared or microwave) drying (See, generally, Cohen and Gutoff, op. cit.). The result of the drying at this stage is a continuous film. Such films when dried may still be water-soluble. A water-soluble film provides good moisture vapor transport, but it is not as well suited as it would otherwise be for many end uses, such as inclusion in a laminate from which protective clothing will be made. A water-soluble cast film can be insolubilized through ionic crosslinking by means of immersion of the film in a solution of at least one divalent or trivalent salt. Examples of suitable divalent and trivalent salts include but are not limited to $CaCl_2$, $SrCl_2$, $BaCl_2$, $ZrOCl_2$, $FeCl_3$ and the like. The salt solution is typically about 1 wt % to about 40 wt % salt in water. The immersion time needed to render the film insoluble will depend on the specific acid polysaccharide, the concentration of the salt solution, and the temperature of the salt solution and is readily determined by one of ordinary skill in the art without undo experimentation. Typical immersion times are in the range of about 1 minute to about 2 hours.

The film can also be made insoluble through covalent crosslinking, for example, by using a carbodiimide-mediated coupling of a diamine with the COOH groups on the acid polysaccharide; or by treating the film with an activating agent (e.g., 2-chloro-1-methylpyridinium iodide) and subjecting the resulting intermediate activated polysaccharide derivative to heat or irradiation, as disclosed in U.S. Pat. No. 5,676,964.

For acid polysaccharides that are insoluble in water, films are prepared from a water-soluble salt form of the acid polysaccharide and then can be made water-insoluble by contacting the film with an acid and then washing, which converts the film from the salt form to the acid form. If the film to be treated with acid is attached to a substrate, the composition and concentration of the acid will be influenced by the nature of the substrate (e.g., its reactivity toward acid) and processing conditions (e.g., temperature and contact time, continuous versus batch process). Suitable acids have a lower pKa than the pKa of the acid polysaccharide to be insolubilized. Typically, the acid is a 1% to 10% by weight aqueous solution of hydrochloric acid or formic acid. Typical contact times are 30 seconds to 3 hours at ambient temperature.

Substrate Materials

Although a free-standing acid polysaccharide film can be incorporated into a protective article, it can, if desired, be adhered to a substrate. An adhesive may or may not be used, depending upon the substrate and the intended use. Thus, the term "adhered" includes application by methods such as gluing, suction, or fusing. Referring to FIG. 1, an acid polysaccharide film 1 may be prepared by casting an acid polysaccharide solution directly onto a substrate 2 that will be incorporated along with the film into a laminate. It can also be cast on a work surface like PET film and coated with an additional layer or layers before or after the work surface is removed and discarded. In certain cases, the substrate onto which an acid polysaccharide film may be prepared may itself be a continuous sheet or film, provided that the permeability of the substrate to water vapor under use conditions is adequate for the particular end use. For example, a garment would require much higher water vapor permeability than a tent or tarpaulin.

A suitable substrate will have at least one surface that is smooth, i.e. that is essentially without protrusions above the plane of the substrate that are higher than the desired thickness of the coating of acid polysaccharide that will be transformed into the film. Thus, a smoother substrate surface is required when the desired thickness of the coating of acid polysaccharide is 25 microns than when it is 100 microns.

A suitable substrate may be, for example, a film, a sheet whose permeability to water vapor under use conditions is adequate for the particular end use, a microporous membrane (i.e., one in which the typical pore size is about 0.1 to 10 micrometers in diameter), or an article prepared from any of the foregoing. It is preferred that the substrate surface that will be in contact with the acid polysaccharide film be both smooth and nonporous.

Suitable substrate materials include polymer films, including elastomers, glassy polymers, and semi-crystalline materials. Desirable substrate properties are flexibility, durability, good moisture transport and minimal or no shrinking or swelling in water. Examples of suitable substrate materials include but are not limited to ionomers, polyolefins, and fluoropolymers.

As used herein the term "polyolefin" means a polymer derived from monomers at least one of which is an olefin. Examples of suitable polyolefins include without limitation polypropylene; polyethylene, e.g., high density polyethylene (HDPE), low density polyethylene (LDPE), linear low density polyethylene (LLDPE), metallocene-catalyzed polyethylene, very low density polyethylene (VLDPE), ultrahigh molecular weight polyethylene (UHMWPE), high performance polyethylene (HPPE); copolymers of ethylene and propylene; copolymers derived from ethylene or propylene and at least one monomer chosen from propylene, methyl acrylate, ethyl acrylate, n-butyl acrylate, methyl methacrylate, acrylic acid, methacrylic acid and carbon monoxide; and copolymers of olefins with a diolefin, such as a copolymer of ethylene, or of propylene, or of ethylene and other olefins, with: linear aliphatic nonconjugated dienes of at least six carbon atoms (such as 1,4-hexadiene) and other dienes, conjugated or not, such as norbornadiene, dicyclopentadiene, ethylidene norbornene, butadiene, and the like.

Other polymers suitable as substrate material are ionomers. The term "ionomer" as used herein refers to a polymer with inorganic salt groups attached to the polymer chain (*Encyclopedia of Polymer Science and Technology*, 2nd ed., H. F. Mark and J. I. Kroschwitz eds., vol. 8, pp. 393-396). Two typical ionomer structures are shown below:

where the ratio of m to n is usually on the order of 10 to 100; that is, typically only about 1 to 9% of the repeat units contain ionic groups. Ions M are typically metal ions like lithium, sodium, lithium, or zinc but can be other cations, for example, ammonium. Typically, an acid form of the polymer is made first and then neutralized to the desired degree with base containing the desired metal ions. Partially neutralized poly(ethylene-co-methacrylic acid) and partially neutralized poly(ethylene-co-acrylic acid) are examples of ionomers, as are sulfonated polystyrene and sulfonated styrene-polyolefin di- and tri-block copolymers. Some examples of ionomers that have been commercialized are Surlyn® thermoplastic resin available from E.I. du Pont de Nemours & Co., Inc. (Wilmington, Del.); Nafion® perfluorosulfonic acid tetrafluoroethylene copolymer, also from DuPont; Flemion® perfluorocarboxylate ionomers developed by Asahi Glass Company in Japan; and a sulfonated ethylene-propylene terpolymer from Exxon. Polyesters and polyamides that have been polymerized with a low level of sulfonated comonomer to enhance textile dyeability (see, e.g., U.S. Pat. Nos. 5,559,205; 5,607,765; and 3,389,549) and sulfonated aromatic polyamides (see, e.g., U.S. Pat. Nos. 3,567,632 and 4,595,708) such as those used in reverse osmosis membranes and other selective separation membranes are also suitable substrates for the present invention.

Fluoropolymers suitable as substrate materials include without limitation those prepared from polymers and copolymers of trifluoroethylene, hexafluoropropylene, monochlorotrifluoroethylene, dichlorodifluoroethylene, tetrafluoroethylene, vinylidene fluoride, vinyl fluoride, among others. For example, the fluoropolymer may be a fluorinated ethylene/propylene copolymer (commonly known as FEP resins); a copolymer of ethylene and chlorotrifluoroethylene, a copolymer of ethylene and tetrafluoroethylene, a perfluorovinyl ether/tetrafluoroethylene copolymer ("PFA"), a vinylidene fluoride/hexafluoropropylene copolymer, vinylidene fluoride/perfluoro (alkyl vinyl ether) dipolymers and terpolymers with tetrafluoroethylene; polyvinylidene fluoride homopolymer (PVDF) or a blend of polyvinylidene fluoride with an acrylic polymer; or polyvinyl fluoride homopolymer (PVF), among others.

If casting onto a microporous hydrophobic surface is desired, a surfactant (e.g., a fluorosurfactant) may or may not be needed to enhance wettability. Examples of suitable microporous hydrophobic substrates include without limitation microporous polypropylene membranes (e.g., Celgard® 2500 and 3400 films available from Celgard LLC, Charlotte, N.C., USA), microporous polyethylene membranes (e.g., Porex Lateral Flow Membrane available from Porex Corporation, Fairburn, Ga., USA), and microporous or expanded PTFE membranes (e.g., microporous Mupor™ PM9P membrane available from Porex Corporation, Fairburn, Ga., USA; expanded PTFE Porous Film available from Yeu Ming Tai Chemical Industrial Co., LTD, Taiwan, Republic of China).

Additional Layers

The protective laminates described herein comprise a continuous acid polysaccharide film and at least one layer of fabric. As appropriate, additional layers (for example, a second fabric layer or a microporous membrane) can be used in a laminate with the objective of (a) creating a composite structure that protects the acid polysaccharide film from an environment that may degrade its performance, and/or (b) creating a laminate, and potentially thus a composite structure thereof, that has features in addition to those offered only by the acid polysaccharide film and the at least one fabric layer, and/or (c) improving the performance of the final structure. For example, additional films or microporous membranes may be applied to the outer surfaces of the acid polysaccharide film and, where present, the substrate, as shown in FIG. 1 (3, 3') by coating, thermal lamination, and other means known in the art, to protect the acid polysaccharide and substrate films from dust and liquids or physical damage. One or more layers of ballistic fabrics can be used to absorb the impact of a projectile and protect the wearer from harm.

In many end uses, particularly apparel, the continuous acid polysaccharide film (and its associated substrate, where present) is incorporated into a structure that includes an outer layer of material (an "outer shell," 5 in FIG. 1) which is exposed to the environment and/or an inner liner 4.

The outer and inner materials may each be chosen for functional reasons such as ruggedness, ballistic resistance, and resistance to abrasion or tearing, as well as to impart a comfortable feel and a fashionable appearance to apparel. Colored and patterned materials may also be used as outer layers to introduce camouflage features in military applications. The outer shell and inner liner materials are typically fabric or microporous membranes.

Fabrics may be wovens or nonwovens (e.g., nonwoven sheet structures created by spun bonded/melt blown processes or by electrospinning as described in, e.g., Z.-M. Huang et al., Composites Science and Technology (2003), 63, 2223-2253). Fabrics may be prepared from any synthetic or natural fiber appropriate for the specific end use in mind. Preferred fabrics may be prepared from aramids, nylons, polyesters, cotton, and blends comprising any of these, such as, but not limited to blends of nylon and cotton fibers ("NYCO"). The term "nylon" as used herein refers to polyamides other than aramids. An aramid is an aromatic polyamide, wherein at least 85% of the amide (—CONH—) linkages are attached directly to two aromatic rings. Flame retardant fibers, including aramids (preferably up to 40%) may be blended with an aramid to impact fabric thermal performance and comfort. A suitable aramid may be in the form of a copolymer that may have as much as 10 percent of other diamine(s) substituted for the diamine of the aramid or as much as 10 percent of other diacid chloride(s) substituted for the diacid chloride of the aramid. A p-aramid would be preferred in a fabric as used in this invention, and poly(p-phenylene terephthalamide) (PPD-T) is the preferred p-aramid. M-aramids may also find use in the present invention, and poly (m-phenylene isophthalamide) (MPD-I) is the preferred m-aramid. P-aramid and m-aramid fibers and yarns particularly suitable for use in the present invention are those sold respectively under the trademarks Kevlar® and Nomex® (E. I. du Pont de Nemours and Company, Wilmington Del., USA), and Teijinconex®, Twaron® and Technora® (Teijin Ltd., Osaka, Japan), and equivalent products offered by others. Typically, the aramid fabric would be used in the outer shell, and the inner liner would more likely contain fabric such as polyester, nylon, cotton, or blends thereof, though m-aramids may be utilized as part of the inner liner as well to improve fire resistance.

Films and microporous membranes may be prepared from any synthetic or natural material appropriate for the specific end use in mind. Examples of films and microporous membranes that can be used as a component of inner liners or outer shells include without limitation expanded poly(tetrafluoroethylene) membranes such as those sold under the trademark GORE-TEX® (W. L. Gore & Associates, Inc., Newark, Del., USA); hydrophobic polyurethane microporous membranes (see, e.g., S. Brzeziński et al., Fibres & Textiles in Eastern Europe, January/December 2005, 13(6), 53-58); microporous (poly)propylene available from ,e.g., 3M (St. Paul, Minn., USA) or Celgard LLC (Charlotte, N.C., USA); thin films of thermoplastic polyurethane such as those sold under the trademark Transport® Brand Film by Omniflex (Greenfield, Mass., USA); Pebax® polyether block amide by Arkema (Paris, France); and DuPont™ Active Layer, a polyester film available from E. I. du Pont de Nemours and Company (Wilmington, Del., USA).

Fabrication

The selectively permeable laminates described herein can be assembled using any of the sewing, stitching, stapling or adhering operations, such as thermally pressing, known in the art.

Referring to FIG. 1, the layers to be assembled include the acid polysaccharide film 1 and at least one other layer. For example, if the acid polysaccharide film is cast on a work device, the film is then dried and detached as a free-standing film. Other layers could be added either before or after detachment from the work device. It may then be attached to another layer (for example, substrate, capping film, outer shell, inner liner) using an adhesive such as a polyurethane-based adhesive. The adhesive may be present as a continuous layer, provided that its moisture permeability is adequate for the intended end use of the laminate; an array of adhesive dots; or in a number of alternative patterns such as lines or curves. The adhesive may be applied in a variety of ways including spraying or gravure roll.

To fabricate a structure or other article from a laminate of this invention, such as an item of apparel, the laminate may be sandwiched between (additional) woven fabrics. Bonding between the film structure and the fabrics may be continuous or semi continuous, for example, with adhesive dots or films. Alternatively, the bonding may be discontinuous, for example by sewing the edges together, an arrangement often referred to as a "hung liner". Other means of discontinuous bonding may include the use of Velcro® strips or zippers.

Uses

The laminate, as well as the continuous acid polysaccharide film itself, is selectively permeable, having a Moisture Vapor Transport Rate ("MVTR") of at least 2 kg/m$^2$/24 h, while the transport rate of materials harmful to human health is low enough to prevent the occurrence of injury, illness or death. The specific transport rate needed will necessarily depend on the specific harmful material; for example, NFPA 1994, 2006 Revision requires <4.0 μg/cm$^2$ one hour cumulative permeation for mustard and <1.25 μg/cm$^2$ for Soman, both of which requirements are met by the laminates and the continuous acid polysaccharide films they contain. Consequently, the laminates, as well as the continuous acid polysaccharide film itself, can be used for the fabrication of, or as a component in, a variety of articles of manufacture, including articles of protective apparel, especially for clothing, garments or other items intended to protect the wearer or user against harm or injury as caused by exposure to toxic chemical and/or biological agents, including without limitation those agents potentially used in a warfighter environment and materials identified as "Toxic Industrial Chemicals" (TICs) or "Toxic Industrial Materials" (TIMs); see, for example, *Guide for the Selection of Chemical and Biological Decontamination Equipment for Emergency First Responders, NIJ Guide* 103-00, *Volume I*, published by the National Institute of Justice, U.S. Department of Justice (October 2001), herein incorporated by reference. A few examples of TICs are phosgene, chlorine, ammonia, parathion, and acrylonitrile. Permeability of the laminate or a layer in the laminate to specific substances may be determined by various methods including, without limitation, those described in ASTM F739-91, "Standard Test Method for Resistance of Protective Clothing Materials to Permeation by Liquids or Gases Under Conditions of Continuous Contact."

In one embodiment, the item of apparel is useful to protect military personnel against dermal exposure to chemical and biological agents potentially encountered in a warfighter environment. Examples of such agents include without limitation nerve agents such as Sarin ("GB," O-isopropyl methylphosphonofluoridate), Soman ("GD," O-Pinacolyl methylphosphonofluoridate), Tabun ("GA," O-Ethyl N,N-dimethylphosphoramidocyanidate), and VX (O-Ethyl S-2-diisopropylaminoethyl methylphosphonothiolate); vesicant agents such as sulfur mustards (e.g., Bis(2-chloroethyl)sulfide and Bis(2-chloroethylthio)methane); Lewisites such as 2-chlorovinyldichloroarsine; nitrogen mustards such as Bis-(2-chloroethyl) ethylamine ("HN1"); tear gases and riot control agents such as Bromobenzyl cyanide ("CA") and Phenylacyl chloride ("CN"); human pathogens such as viruses (e.g., encephalitis viruses, Ebola virus), bacteria (e.g., *Rickettsia rickettsii, Bacillus anthracis, Clostridium botulinum*), and toxins (e.g., Ricin, Cholera toxins). A human pathogen is a microorganism that causes disease in humans.

In a further embodiment, the item of apparel is useful to protect first responder personnel from known or unknown chemical or biological agents potentially encountered in an emergency response situation. In yet another embodiment, the item is intended to protect cleanup personnel from chemical or biological agents during a hazmat response situation. Examples of hazardous material in addition to those listed above include certain pesticides, particularly organophosphate pesticides.

Such clothing, garments or other items include without limitation coveralls, protective suits, coats, jackets, limited-use protective garments, raingear, ski pants, gloves, socks, boots, shoe and boot covers, trousers, hoods, hats, masks and shirts.

In another embodiment, the laminates can be used to create a protective cover, such as a tarpaulin, or a collective shelter, such as a tent, to protect against chemical and/or biological warfare agents.

Furthermore, the laminates can be used in various medical applications as protection against toxic chemical and/or biological agents. In one embodiment, the laminates could be used to construct items of apparel for health care workers, such as medical or surgical gowns, gloves, slippers, shoe or boot covers, and head coverings.

EXAMPLES

Specific embodiments of the present invention are illustrated in the following examples. The embodiments of the invention on which these examples are based are illustrative only, and do not limit the scope of the appended claims.

The meaning of the abbreviations used in the examples is as follows: "min" means minute(s), "h" means hour(s), "kg" means kilogram(s), "g" means gram(s), "mg" means milligram(s), "µg" means microgram(s), "oz" means ounce(s), "yd" means yard(s), "mol" means mole(s), "mmol" means millimole(s), "m" means meter(s), "cm" means centimeter(s), "mm" means millimeter(s), "µm" means micrometer(s), "mL" means milliliter(s), "µL" means microliter(s), "wt %" means weight percent, "$M_w$" means weight average molecular weight, "Pa" means Pascal, "mPa" means millipascal, "cP" means centipoise, and "ePTFE" means expanded poly(tetrafluoroethylene). Unless otherwise specified, the water used is distilled or deionized water.

Materials

All materials were used as received. Alginic acid sodium salt ("sodium alginate"), alginic acid from brown algae, and sodium carboxymethyl cellulose (average $M_w$=700,000; 0.9 mol carboxymethyl per mol cellulose) were purchased from the Aldrich Chemical Company (Milwaukee, Wis., USA). Propylene glycol alginate (PGA) was obtained from FMC BioPolymer (Philadelphia, Pa., USA) under the trademark Protonal®. According to the manufacturer, Protonal® GP 7530 consists of alginic acid biopolymer that has been 80% esterified by reaction with propylene glycol; it has pH of 3.8 and viscosity of 135 mPa·s in 1% aqueous solution. The carrageenans were also obtained from FMC BioPolymer under the trademark Gelcarin®. According to the manufacturer, both Gelcarin® GP 359 and Gelcarin® GP 379 are iota-carrageenans, but GP 379 is more elastic than GP 359; Gelcarin® GP 812 is a kappa-carrageenan. Chitosan was obtained from Primex Ingredients ASA (Norway) under the trademark ChitoClear®. According to the manufacturer, Primex ChitoClear® TM-656 has a Brookfield viscosity of 26 cP (0.026 Pa·s, 1% chitosan in a 1% aqueous acetic acid solution).

The polyester non-woven substrate Sontara® 8004 was obtained from E.I. du Pont de Nemours & Company (Wilmington, Del., USA), as was an experimental (non-commercial) 0.75 mil (19 microns) thick film of Nafion® perfluorosulfonic acid/polytetrafluoroethylene copolymer in the acid form. Celgard® 2500, a 25 micron thick microporous polypropylene membrane (55% porosity, pore size 0.209× 0.054 microns), and Celgard® 3400, a 25 micron thick microporous polypropylene membrane coated with a wetting agent (37% porosity, pore size 0.117×0.042 microns), were obtained from Celgard LLC (Charlotte, N.C., USA). Mupor™ PM9P, a 2 mil (51 microns) thick microporous PTFE membrane (30% porosity, 1 micron pore size), and Porex Lateral Flow Membrane, a 10 mil (0.25 mm) thick microporous polyethylene membrane (6-10 micron pore size), were obtained from Porex Corporation (Fairburn, Ga., USA). A 0.7 mil (18 microns) thick expanded PTFE Porous Film, style 2101, was obtained from Yeu Ming Tai Chemical Industrial Co., LTD (Taiwan, Republic of China).

Methods

Standard Glass Plate Preparation

All films were cast onto Pyrex® glass plates whose surfaces were rigorously cleaned with water and detergent, alcohol, strong base and strong acid before use. The following cleaning procedure was used for the examples, but other thorough cleaning protocols may also be suitable. A Pyrex® glass plate was washed with an aqueous solution of Micro-90 laboratory glassware cleaning agent, rinsed with water, and wiped dry with a paper towel. The plate was then cleaned with isopropanol and wiped dry. Next, a 10 wt % aqueous NaOH solution was coated on the plate, allowed to stand for five minutes, rinsed off with distilled water, and the plate was wiped dry. Finally, concentrated nitric acid was coated on the plate, allowed to stand for one minute, and rinsed off with distilled water. The plate was deemed ready for casting after a final rinse with distilled water and drying with soft paper towels.

Moisture Vapor Transmission Rate (MVTR).

MVTR was measured by a method derived from the Inverted Cup method of MVTR measurement [ASTM E 96 Procedure BW, Standard Test Methods for Water Vapor Transmission of Fabrics (ASTM 1999)]. For each test, a vessel with an opening on top was charged with water and then the opening was covered first with a moisture vapor permeable (liquid impermeable) layer of expanded-PTFE film ("ePTFE"), then with the sample for which the MVTR was to be measured, and finally by a woven Nomex® fabric overlayer [5.6 oz/yd$^2$ (0.19 kg m$^2$), treated with durable water repellant finish]. The three layers were sealed in place, inverted for 30 minutes to condition the layers, weighed to the nearest 0.001 g, and then contacted with a dry stream of nitrogen while inverted. After the specified time, the sample was re-weighed and the MVTR calculated (kg m$^2$/24 h) by the following equation:

$$MVTR=1/[(1/MVTR_{obs.})-(1/MVTR_{mb})]$$

where $MVTR_{obs}$ is observed MVTR of the experiment and $MVTR_{mb}$ is the MVTR of the ePTFE moisture barrier (measured separately). The reported values are the average of results from four replicate samples.

Dimethylmethylphosphonate ("DMMP") Permeation.

DMMP was used as a relatively non-toxic simulant for chemical warfare G-class nerve agents. The DMMP permeation for the examples described below was carried out as follows: for each measurement, a vessel with an opening on top was charged with a measured amount of water containing 0.100% propylene glycol as an internal GC standard. The opening was covered with the sample film and a Nomex® woven fabric overlayer [5.6 oz/yd² (0.19 kg m²), treated with durable water repellant finish]. The layers were sealed in place and the fabric surface was treated with one 2 μL drop of DMMP (2.3 mg). The vessel was placed in a nitrogen-purged box for 17 h and then the DMMP concentration in the water was measured by GC analysis. Results are reported in μg of DMMP measured in the water after 17 h and are the average of five replicate samples. The DMMP was obtained from Aldrich Chemical Company and used as received.

Example 1

This example illustrates the preparation, insolubilization, and ionic cross-linking of a protective sodium alginate film.

A food blender cup was preheated in a boiling water bath, placed on the blender's motor, and charged with 95 g of distilled water that had been preheated to 80° C. 5 g of sodium alginate powder were added, and the mixture was agitated on high speed until the solid dissolved (2-5 min). The viscous, light golden-brown colored solution was then pressure filtered through Whatman 514 filter paper (20-25 micron pore size). The solution was allowed to stand overnight at room temperature to eliminate bubbles before casting a film. This casting solution was 5 wt % in sodium alginate and had a pH of 6.85.

Two 4"×8" (10 cm×20 cm) films were prepared by casting the solution onto Pyrex® glass plates using a 50 mil (1.27 mm), 4"-square (10 cm-square) doctor knife and drying at room temperature overnight. The films were lifted from the glass plates by raising the edges with a sharp razor blade. Each film was then cut into three pieces of equal size to give six 4"×2.6" (10 cm×6.6 cm) films labeled 1A-1F.

Film 1A was not treated further and remained water soluble. Films 1B and 1C were insolubilized by immersion for 1.5 h in 10% aqueous solutions of hydrochloric acid (1B) or formic acid (1C). Acid treatment presumably converts the water-soluble sodium salt of alginic acid to the water-insoluble alginic acid polymer. Films 1D-1F were insolubilized and ionically cross-linked by immersion for 1.5 h in 10 wt % aqueous solutions of the following divalent metal salts: calcium chloride (CaCl$_2$, 1D), barium chloride (BaCl$_2$, 1E), or zirconyl chloride (ZrOCl$_2$, 1F). After immersion in the treatment baths, Films 1B-1F were laid flat on glass plates, with the corners weighed down to prevent curling and shrinkage during drying, and dried at room temperature overnight. The treated films 1B-1F were no longer soluble in water.

MVTR and DMMP permeation through Films 1A-1F were measured using a Nomex® overlayer. The results are given in Table 1.

TABLE 1

Sodium alginate film data

| Sample | Treatment | Thickness (mil (μm)) | MVTR (kg/m²/24 h) | Ave. DMMP (μg in 17 h) | DMMP values (μg in 17 h) |
|---|---|---|---|---|---|
| 1A | None | 1.2 (30) | 31.7 | 3 | 0, 0, 13, 0, 0 |
| 1B | HCl | 1.2 (30) | 24.1 | 23 | 69, 30, 14, 0, 0 |
| 1C | HCOOH | 1.6 (41) | 23.0 | 12 | 36, 8, 14, 0, 0 |
| 1D | CaCl$_2$ | 1.6 (41) | 21.0 | 0 | 0, 0, 0, 0, 0 |
| 1E | BaCl$_2$ | 1.2 (30) | 24.5 | 0 | 0, 0, 0, 0, 0 |
| 1F | ZrOCl$_2$ | 2.0 (51) | 18.0 | 0 | 0, 0, 0, 0, 0 |

Example 2

This example 1) illustrates a simpler method of preparing a sodium alginate solution for casting, and 2) shows that a thinner alginate film provides better moisture permeability while remaining an excellent barrier to DMMP.

5 g of sodium alginate and 95 g of distilled water were stirred overnight at room temperature until all the solid dissolved. The resulting 5 wt % sodium alginate solution was viscous but free of bubbles, and light golden-brown in color.

Film 2 was prepared by casting the solution onto a Pyrex® glass plate using a 40 mil (1.02 mm) doctor knife and drying at room temperature overnight. The film was lifted from the glass plate by raising the edges with a sharp razor blade. The free film was insolubilized and ionically cross-linked by immersion for 5 min in a 10 wt % aqueous solution of barium chloride (BaCl$_2$). The film was laid flat on a glass plate, with the corners weighed down to prevent curling and shrinkage during drying, and dried at room temperature overnight. The treated film was 0.8 mil (20 μm) thick and was not soluble in water.

Measurements for Film 2 using a Nomex® overlayer were: MVTR=28.1 kg/m²/24 h and DMMP permeation=0 μg in 17 h (average of the following five values: 0, 0, 0, 0, 0). Film 2 was ⅓ less thick than Film 1E (Table 1) and had higher MVTR but the same excellent DMMP resistance.

Example 3

This example demonstrates that a protective film may be prepared starting from alginic acid itself, instead of the sodium salt of alginic acid. The alginic acid biopolymer is dissolved in water by addition of a base.

6.1 g (34.9 mmol COOH) of alginic acid were added to 94.2 g of vigorously stirred water at room temperature. Most of the solid did not dissolve, and the solution pH was 2.45. Tetramethylethylenediamine ("TMEDA," Aldrich Chemical Company, Milwaukee, Wis., USA, used as received) was added in 0.2 mL portions until all of the alginic acid dissolved. A viscous, light yellow solution with pH=4.23 was obtained after addition of 2 mL (1.54 g, 13.3 mmol) TMEDA total. The solution was mixed for 10 min to allow bubbles to escape. This casting solution was 6.0 wt % in alginic acid.

Film 3 was prepared by casting the solution onto a Pyrex® glass plate using a 30 mil (0.76 mm) doctor knife and drying at 150° C. for 30 min in a nitrogen-filled oven. The dried film was 1.2 mil (30 microns) thick, and was lifted from the glass plate by raising the edges with a sharp razor blade. The film was not treated further and remained soluble in water.

Measurements for Film 3 using a Nomex® overlayer were: MVTR=27.4 kg m²/24 h and DMMP permeation=4 μg in 17 h (average of the following five values: 0, 0, 0, 0, 18).

Example 4

This example demonstrates that a protective film may be prepared starting from propylene glycol alginate (PGA), instead of alginic acid or the sodium salt of alginic acid. Protonal® Ester GP 7530 (FMC BioPolymer, Philadelphia, Pa., USA) consists of alginic acid biopolymer, which has been 80% esterified by reaction with propylene glycol (i.e. 80% of the carboxylic acid groups are replaced by propylene glycol ester functional groups). The PGA ester is dissolved in water by addition of a base.

A blender food cup was charged with 200 g of distilled water. 13 g of Protonal® Ester GP 7530 off-white powder were added, along with ~0.2 g of solid sodium hydroxide (NaOH) in pellet form. The mixture was blended at high speed for 2 min until all the solids dissolved, and the pH of the solution was measured. Further portions of NaOH were added, followed by blending for 2 min after each addition, until the pH of the solution reached 5.9. The resulting solution was 6.1 wt % in PGA and was substantially bubble-free after standing overnight at room temperature. Note that the viscosity of the PGA/NaOH solution varied with pH: solutions with pH<6.5 had viscosity suitable for film-casting, while solutions with pH=6.5-7.0 exhibited reduced viscosity and were not viscous enough to draw into a film using a doctor knife.

A 4"×8" (10 cm×20 cm) film was prepared by casting the solution onto a Pyrex® glass plate using a 50 mil (1.27 mm) doctor knife and drying at room temperature overnight. The film was lifted from the glass plate by raising the edges with a sharp razor blade, and then cut into three pieces of equal size to give three 4"×2.6" (10 cm×6.6 cm) films labeled 4A-4C.

Film 4A was not treated further and remained water soluble. The free (non-esterified) carboxylate groups of Films 4B and 4C were ionically cross-linked by immersion for 1.5 h in 10 wt % aqueous solutions of barium chloride ($BaCl_2$) and zirconyl chloride ($ZrOCl_2$), respectively. Films 4B and 4C were not soluble in water after these treatments.

MVTR and DMMP permeation through Films 4A-4C were measured using a Nomex® overlayer. The results are given in Table 2.

TABLE 2

Propylene glycol alginate film data

| Sample | Treatment | Thickness (mil (μm)) | MVTR (kg/m²/24 h) | Ave. DMMP (μg in 17 h) | DMMP values (μg in 17 h) |
|---|---|---|---|---|---|
| 4A | None | 1.2 (30) | 27.9 | 18 | 0, 22, 52, 0, 16 |
| 4B | $BaCl_2$ | 2.0 (51) | 20.5 | 3 | 0, 0, 0, 0, 15 |
| 4C | $ZrOCl_2$ | 1.6 (41) | 14.7 | 9 | 45, 0, 0, 0, 0 |

Comparative Example A

This Comparative Example shows that treatment of a macroporous fabric in a manner that does not produce a continuous film does not provide a material with satisfactory protection characteristics, as indicated by the DMMP permeation values.

A polyester non-woven substrate, Sontara® 8004 (E.I. du Pont de Nemours and Company), was taped flat to the surface of a Pyrex® glass plate. The 5 wt % sodium alginate solution prepared in Example 2 was cast onto the immobilized fabric substrate using a 40 mil (1.02 mm) doctor knife. The casting solution wet the substrate, soaked through the fabric, and made a film that adhered to both the underside of the fabric and the glass plate below it. After drying at room temperature overnight, the film/substrate composite was lifted from the glass plate by raising the edges with a sharp razor blade. The supported film was insolubilized and ionically cross-linked by immersion for 5 min in a 10 wt % aqueous solution of barium chloride ($BaCl_2$). It was then washed with water to remove excess $BaCl_2$, laid flat on a glass plate with the corners weighed down to prevent curling and shrinkage during drying and dried at room temperature overnight. The film adhered to the substrate and did not dissolve when the composite was immersed in water.

Measurements for Comparative Film A using a Nomex® overlayer were: MVTR=26.1 kg m²/24 h and DMMP permeation=262 μg in 17 h (average of the following five values: 278, 229, 241, 289, 273). Scanning Electron Microscopy (SEM) micrographs of Comparative Film A confirmed that the sodium alginate polymer did not form a continuous film on the porous Sontara® substrate. Instead, cracks, holes and gaps (ten to several hundred microns in size) were observed in the film.

Example 5

This example demonstrates that continuous, protective films may be prepared on microporous or non-porous breathable substrates.

A 5 wt % sodium alginate casting solution was prepared as in Example 2. Films 5A-5E were prepared by casting the solution onto microporous or non-porous substrates, which were taped flat to the surface of Pyrex® glass plates, using a 40 mil (1.01 mm) doctor knife. The substrates used were: Celgard® 2500, an uncoated 25 micron thick microporous polypropylene (5A); Celgard 3400®, a 25 micron thick microporous polypropylene coated with a surfactant to improve wetting (5B); Porex Lateral Flow Membrane, a 10 mil thick microporous polyethylene membrane with 6-10 micron pores (5C); and 0.75 mil thick Nafion® film (5D). In all cases, the sodium alginate casting solution stayed substantially on top of the microporous polymer support, rather than penetrating completely through the substrate's pores as in Comparative Example A.

The supported film composites were dried at room temperature overnight and then removed from the glass plates. The supported films were insolubilized and ionically cross-linked by immersion for 5 min in a 10 wt % aqueous solution of barium chloride ($BaCl_2$). Finally, the composites were laid flat on glass plates, with the corners weighed down to prevent curling and shrinkage during drying, and dried at room temperature overnight. After $BaCl_2$ treatment the films adhered to the substrates and did not dissolve or delaminate when the composites were immersed in water.

MVTR and DMMP permeation through Films 5A-5D were measured using a Nomex® overlayer. The results are given in Table 3.

TABLE 3

Supported sodium alginate film data

| Sample | Support | Thickness (mil (μm))* | MVTR (kg/m²/24 h) | Ave. DMMP (μg in 17 h) | DMMP values (μg in 17 h) |
|---|---|---|---|---|---|
| 5A | Celgard® 2500 | 2.0 (51) | 22.1 | 26 | 29, 21, 39, 0, 41 |
| 5B | Celgard® 3400 | 2.0 (51) | 30.7 | 0 | 0, 0, 0, 0, 0 |

TABLE 3-continued

Supported sodium alginate film data

| Sample | Support | Thickness (mil (μm))* | MVTR (kg/m²/ 24 h) | Ave. DMMP (μg in 17 h) | DMMP values (μg in 17 h) |
|---|---|---|---|---|---|
| 5C | Porex Lateral Flow | 12.0 (305) | 22.8 | 0 | 0, 0, 0, 0, 0 |
| 5D | Nafion ® | 1.6 (41) | 21.3 | 21 | 24, 43, 0, 17, 22 |

*Total thickness of support plus sodium alginate film coating

Example 6

This example shows that continuous, protective films may be prepared on microporous or non-porous substrates using casting solutions that contain a fluorosurfactant to improve wetting of the substrate surface.

A 5 wt % sodium alginate casting solution was prepared as in Example 2, and 0.2 g (0.2 wt %) of Zonyl® FSA fluorosurfactant (E.I. du Pont de Nemours and Company, Wilmington, Del., USA) were added to the solution. The surfactant was not completely miscible with the casting solution, but appeared to form a microemulsion. The emulsion was allowed to separate into two phases before casting, and the aqueous phase was used to cast films.

Films 6A-6D were prepared by casting the solution onto microporous or non-porous substrates, which were taped flat to the surface of Pyrex® glass plates, using a 40 mil (1.01 mm) doctor knife. The substrates used were: Celgard® 2500, an uncoated 25 micron thick microporous polypropylene (6A); 0.75 mil (19 microns) Nafion® film (6B); 2 mil (51 microns) thick Mupor™ PM9P PTFE membrane (6C); and 0.7 mil (18 microns) thick EPTFE film (6D). Note that the latter two substrates (Mupor™ and EPTFE) were not wetted by the casting solution of Example 5, which lacked fluorosurfactant, but were wetted well by the surfactant-containing casting solution of Example 6. In all cases the sodium alginate casting solution stayed substantially on top of the polymer support, rather than penetrating completely through it as in Comparative Example A.

The supported film composites were dried at room temperature overnight and then removed from the glass plates. The supported films were insolubilized and ionically cross-linked by immersion for 5 min in a 10 wt % aqueous solution of barium chloride ($BaCl_2$). Finally, the composites were laid flat on glass plates, with the corners weighed down to prevent curling and shrinkage during drying, and dried at room temperature overnight. After $BaCl_2$ treatment the films adhered to the substrates and did not dissolve or delaminate when the composites were immersed in water.

MVTR and DMMP permeation through Films 6A-6D were measured using a Nomex® overlayer. The results are given in Table 4.

TABLE 4

Supported sodium alginate/fluorosurfactant film data

| Sample | Support | Thickness (mil (μm))* | MVTR (kg/m²/ 24 h) | Ave. DMMP (μg in 17 h) | DMMP values (μg in 17 h) |
|---|---|---|---|---|---|
| 6A | Celgard ® 2500 | 2.0 (51) | 34.9 | 9 | 17, 0, 0, 27, 0 |
| 6B | Nafion ® | 2.0 (51) | 29.0 | 17 | 14, 8, 13, 11, 39 |
| 6C | Mupor ™ PM9P | 3.1 (79) | 20.9 | 0 | 0, 0, 0, 0, 0 |
| 6D | ePTFE | 2.0 (51) | 38.2 | 3 | 15, 0, 0, 0, 0 |

*Total thickness of support plus sodium alginate film coating

Films were also cast on Celgard® 3400, a 25 micron thick microporous polypropylene coated with a surfactant to improve wetting (6E), and Porex Lateral Flow Membrane, a microporous polyethylene membrane with 6-10 micron pores (6F). In both cases grainy, non-homogeneous films were formed due to poor substrate wetting. For film 6E, measured MVTR was extremely high, as was DMMP permeation, indicating formation of a non-continuous and thus non-protective film. In the case of 6F, MVTR was variable at different spots in the film, and DMMP permeation was high.

Example 7

This example illustrates that a protective film may be prepared from a casting solution that comprises a mixture of sodium alginate and chitosan formate polyelectrolytes. A film heated to 150° C. overnight was insoluble in water, although no acid, divalent metal salt, or other insolubilizing agent was added.

A 5 wt % sodium alginate casting solution was prepared as in Example 2. A 5 wt % solution of chitosan as the formate was prepared as described in U.S. patent application Ser. No. 11/593,598, as follows:

A food blender cup was preheated in a boiling water bath, placed on the blender's motor, and charged with 564 g of hot water and 36 g of chitosan (Primex ChitoClear® TM-656) (0.22 mole —$NH_2$). While stirring strongly, 11.5 g (0.25 mole) of 98% purity formic acid (Aldrich Chemical Company, Milwaukee, Wis., USA) was added. The viscosity increased immediately. After three minutes of stirring, the resulting viscous mass was poured into a Pyrex® glass bottle and heated for 1 h in a boiling water bath. Afterward, it was pressure filtered through coarse filter paper. The solution was cleared of bubbles after standing for three days at room temperature.

To make the alginate-chitosan casting solution, a food blender cup was charged with 100 g of the 5 wt % sodium alginate solution and 100 g of the 5 wt % chitosan solution described above. The solutions were blended on high speed for 10 min at ambient temperature. The resulting mixed solution was very viscous and somewhat heterogeneous, due to phase separation of the two polymers and/or formation of small amounts of precipitate. The casting solution was 2.5 wt % in sodium alginate and 2.5 wt % in chitosan formate.

A 4"×8" (10 cm×20 cm) film was prepared by casting the solution onto a Pyrex® glass plate using a 40 mil (1.01 mm) doctor knife and drying at room temperature overnight. The film was lifted from the glass plate by raising the edges with a sharp razor blade, then cut into three 4"×2.6" (10 cm×6.6 cm) pieces, labeled 7A-7C.

Film 7A was not treated further and remained water soluble. The sodium alginate component of Film 7B was ionically cross-linked by immersion overnight in a 10 wt % aqueous solution of barium chloride ($BaCl_2$), which made the treated film insoluble in water. Film 7C was insolubilized by heating overnight at 150° C. under a nitrogen atmosphere. Heat treatment caused Film 7C to turn from a light milky-brown color to a dark golden-brown color. A reaction between the carboxylate groups of the alginate polymer and the amine groups of the chitosan polymer may occur at 150° C. to form covalent amide bonds between the polymer molecules.

MVTR and DMMP permeation through Films 7A-7C were measured using a Nomex® overlayer. The results are given in Table 5.

TABLE 5

Sodium alginate/chitosan formate film data

| Sample | Treatment | Thickness (mil(μm)) | MVTR (kg/m²/ 24 h) | Ave. DMMP (μg in 17 h) | DMMP values (μg in 17 h) |
|---|---|---|---|---|---|
| 7A | None | 0.6 (15) | 38.6 | 0 | 0, 0, 0, 0 |
| 7B | BaCl$_2$ | 0.6 (15) | 32.0 | 21 | 22, 0, 49, 7, 0 |
| 7C | 150° C. | 0.2 (5) | 31.3 | 0 | 0, 0, 0, 0, 0 |

Example 8

This example illustrates the preparation, insolubilization, and ionic cross-linking of protective carrageenan films.

In a glass jar, 50 g of distilled water were heated to 75° C. 2.5 g of Gelcarin® GP 359 iota-carrageenan off-white powder were added, and the mixture was stirred until the solid dissolved (16 h). The resulting viscous, golden-brown colored solution was 4.8 wt % in carrageenan and had a pH of 8.49. When the solution was cooled to room temperature, it formed a thermoreversible transparent gel, which redissolved upon reheating to 80° C. The solution was stored at room temperature and heated to 80° C. in a nitrogen-filled oven immediately before casting. Solutions of Gelcarin® GP 379 iota-carrageenan (4.8 wt %, pH 8.43) and Gelcarin® GP 812 kappa-carrageenan (4.8 wt %, pH 8.24) were prepared in the same way.

The carrageenan casting solutions, as well as the Pyrex® glass plates that the films were cast on and the doctor knife used to cast films, were heated to 80° C. before use by standing in a nitrogen-filled oven for several hours. A 4"×8" (10 cm×20 cm) film was prepared from each carrageenan solution by casting the hot solution onto a preheated Pyrex® glass plate using the preheated 50 mil (1.27 mm) doctor knife. The films were then dried at room temperature overnight. The films were lifted from the glass plates by raising the edges with a sharp razor blade, and each film was cut into two pieces of equal size to give six 4"×4" (10 cm×10 cm) films labeled 8A-8F.

Films 8A (GP 359 iota-carrageenan), 8C (GP 379 iota-carrageenan), and 8E (GP 812 kappa-carrageenan) were not treated further and remained water soluble. Films 8B, (GP 359 iota-carrageenan), 8D (GP 379 iota-carrageenan), and 8F (GP 812 kappa-carrageenan) were insolubilized by immersion for 1.5 h in a 40 wt % aqueous solution of zirconyl chloride (ZrOCl$_2$). After immersion in the ZrOCl$_2$ bath, Films 8B, 8D, and 8F were laid flat on glass plates, with the corners weighed down to prevent curling and shrinkage during drying, and dried at room temperature overnight. The treated films 8B, 8D, and 8F were no longer soluble in water.

MVTR and DMMP permeation through Films 8A-8F were measured using a Nomex® overlayer. The results are given in Table 6. Carrageenan films that were not treated with ZrOCl$_2$ (8A, 8C, and 8E) were found to be poor barriers to DMMP and thus not useful in protective applications, while films that were treated with ZrOCl$_2$ (8B, 8D, and 8F) proved to be excellent barriers to DMMP permeation.

TABLE 6

Carrageenan film data

| Sample | Treatment | Thickness (mil (μm)) | MVTR (kg/m²/ 24 h) | Ave. DMMP (μg in 17 h) | DMMP values (μg in 17 h) |
|---|---|---|---|---|---|
| 8A | None | 1.4 (36) | 31.1 | 92 | 41, 108, 79, 47, 186 |
| 8B | ZrOCl$_2$ | 2.8 (71) | 25.7 | 6 | 0, 31, 0, 0, 0 |
| 8C | None | 1.2 (30) | 26.2 | 80 | 90, 74, 58, 110, 66 |
| 8D | ZrOCl$_2$ | 2.4 (61) | 34.5 | 0 | 0, 0, 0, 0, 0 |
| 8E | None | 1.4 (36) | 40.8 | 169 | 146, 189, 195, 209, 107 |
| 8F | ZrOCl$_2$ | 1.4 (36) | 32.9 | 8 | 18, 0, 0, 21, 0 |

Example 9

This example illustrates the preparation and insolubilization of protective carboxymethylcellulose films.

A viscous, 4 wt % casting solution was prepared by rapidly mixing 4 g of sodium carboxymethyl cellulose (average $M_w$=700,000; Aldrich Chemical Company, Milwaukee, Wis., USA) with 96 g of water. The mixture was placed in a bottle and rolled on a roll mill overnight, until a solution free of gel particles was obtained. The solution was filtered and allowed to stand until clear of bubbles.

A 4"×8" (10 cm×20 cm) film was prepared by casting the sodium carboxymethyl cellulose solution onto a Pyrex® glass plate using a 30 mil (0.76 mm) doctor knife. The film was dried in air on a heated press platen (press open) at 100° C. for 4-8 min. One half of the film was then lifted from the glass plate by raising the edges with a sharp razor blade, and removed from the glass. This film, labeled 9A, was not treated further and remained soluble in water.

The other half of the film remained on the glass plate and was labeled 9B. While still supported on the plate, Film 9B was immersed in a room temperature solution of 5% aqueous hydrochloric acid (HCl) for 10 min. A weak gel formed from the film; acid treatment presumably converted the water-soluble sodium salt of carboxymethyl cellulose to the water-insoluble carboxylic acid-containing polymer. Film 9B was washed with water to remove excess HCl and NaCl salts, until the washes were neutral in pH. The film was dried in air on a heated press platen (press open) at 100° C. for 4-8 min, and then lifted from the glass plate by raising the edges with a sharp razor blade. The transparent, colorless Film 9B obtained was not soluble in water.

MVTR and DMMP permeation through Films 9A and 9B were measured using a Nomex® overlayer. The results are given in Table 7.

TABLE 7

Sodium carboxymethyl cellulose film data

| Sample | Treatment | Thickness (mil (μm)) | MVTR (kg/m²/24 h) | Ave. DMMP (μg in 17 h) | DMMP values (μg in 17 h) |
|---|---|---|---|---|---|
| 9A | None | ~1 (~25) | 32.1 | 4 | 9, 0, 0, 10, 0 |
| 9B | HCl | ~1 ('25) | 32.9 | 1 | 6, 0, 0, 0, 0 |

Example 10

This example illustrates the preparation and insolubilization of a protective pectin film.

A 3.4 wt % solution of pectin was prepared by adding 7 g of pectin to 200 g of distilled water. The solution was stirred vigorously at room temperature for 3 days. The cloudy, light orange solution was then allowed to stand overnight at room temperature to eliminate bubbles.

A 4"×8" (10 cm×20 cm) film was prepared by casting the solution onto a Pyrex® glass plate using a 50 mil (1.27 mm), 4"-square (10 cm-square) doctor knife and drying at room temperature overnight. The 1 mil (25 microns) thick dried film was removed from the glass plate by raising the edges with a sharp razor blade. The film was then cut into two pieces of equal size to give two 4"×4" films (10 cm×10 cm) labeled 10A and 10B.

Film 10A was not treated further and remained water soluble. Film 10B was insolubilized and ionically crosslinked by immersion for 5 min in a 40% aqueous solution of zirconyl chloride ($ZrOCl_2$). After immersion in the treatment bath, Film 10B was laid flat on a towel, with the corners weighed down to minimize curling and shrinkage during drying, and dried at room temperature overnight. Film 10B was no longer soluble in water.

MVTR and DMMP permeation through Films 10A and 10B were measured using a Nomex® overlayer. The results are given in Table 8.

TABLE 8

Pectin film data

| Sample | Treatment | Thickness (mil (μm)) | MVTR (kg/m²/ 24 h) | Ave. DMMP (μg in 17 h) | DMMP values (μg in 17 h) |
|---|---|---|---|---|---|
| 10A | None | 1.0 (25) | 21.9 | 0 | 0, 0, 0, 0, 0 |
| 10B | $ZrOCl_2$ | 1.1 (28) | 26.7 | 0 | 0, 0, 0, 0, 0 |

Example 11

This example illustrates that the protective abilities of pectin film are not affected by the degree to which the pectin is esterified.

Three pectin films (11A, 11B and 11C) were prepared as follows:

Film 11A: 2.8 g of 30% esterified pectin were added to 77.2 g of vigorously stirred water at room temperature to give a 3.5 wt % esterified pectin solution. The solution became cloudy and light orange. A 4"×8" (10 cm×20 cm) film was prepared by casting the 30% esterified pectin solution onto a Pyrex® glass plate using a 50 mil (1.27 mm) knife. The film was dried at room temperature overnight. The film was then lifted from the glass plate by raising the edges with a sharp razor blade, and removed from the glass. This film was not treated further and remained soluble in water.

Film 11B: 4 g of 60% esterified pectin were added to 76 g of vigorously stirred water at room temperature to give a 5.0 wt % esterified pectin solution. The solution became cloudy and light orange. The film was prepared in a manner identical to the preparation described for film 11A.

Film 11C: 5 g of 90% esterified pectin were added to 72 g of vigorously stirred water to give a 6.5 wt % esterified pectin solution. The solution appeared less viscous and more opaque than the solutions prepared for films 11A and 11B. Therefore, 150 μL of a 10 wt % aqueous sodium hydroxide solution were added to 5 mL of the casting solution. The solution quickly became clearer and slightly viscous. A film was prepared by casting the solution onto a Pyrex® glass plate using a 50 mil (1.27 mm) doctor knife. The film was dried at room temperature overnight. The film was then lifted from the glass plate by raising the edges with a sharp razor blade, and removed from the glass. This film was not treated further and remained soluble in water.

MVTR and DMMP permeation through Films 11A, 11B and 11C were measured using a Nomex® overlayer. The results are given in Table 9.

TABLE 9

Esterified pectin film data

| Sample | % Pectin esterification | Thickness (mil (μm)) | MVTR (kg/m²/ 24 h) | Ave. DMMP (μg in 17 h) | DMMP values (μg in 17 h) |
|---|---|---|---|---|---|
| 11A | 30 | 1.0 (25) | 29.8 | 4 | 21, 0, 0, 0, 0 |
| 11B | 60 | 1.0 (25) | 27.1 | 2 | 0, 0, 9, 0, 0 |
| 11C | 90 | 1.0 (25) | 25.2 | 3 | 0, 0, 0, 0, 17 |

Example 12

This example illustrates that a water-insensitive protective film may be prepared from a mixture of pectin and chitosan.

2 g of chitosan (Primex ChitoClear® TM-656) were dissolved in 200 g of vigorously stirred hydrochloric acid (0.1 N). 2 g of pectin were dissolved in 50 g of vigorously stirred water. The two solutions were combined and stirred vigorously for 1 hour. The solution was heated to 85° C. for 10 hours until 56 g of water evaporated, giving a final casting solution containing 1.0 mil wt % chitosan and 1.0 mil wt % pectin. The solution was allowed to stand overnight to eliminate bubbles.

Film 12 was prepared by casting the solution onto a Pyrex® glass plate using a 50 mil (1.27 mm) doctor knife. The 0.7 mil (18 μm) thick film was dried at room temperature overnight. The film was then lifted from the glass plate by raising the edges with a sharp razor blade, and removed from the glass. This film was not treated further. The film did not dissolve after 72 hours soaking in water; however, it became soft and weak.

Measurements for Film 12 using a Nomex® overlayer were: MVTR=42.7 kg/m²/24 h and DMMP permeation=0 μg in 17 h (average of the following five values: 0, 0, 0, 0, 0).

Example 13

This example illustrates the effect of various additives on the protective properties of pectin films.

Film 13A: To 50 g of a 3.5% solution of pectin in water was added 0.19 mL of 50% aqueous glyoxylic acid with vigorous stirring. A film was prepared by casting the solution onto a Pyrex® glass plate using a 50 mil (1.27 mm), 4"-square (10-cm square) doctor knife and drying at room temperature overnight. The 1 mil (25 microns) thick dried film was removed from the glass plate by raising the edges with a sharp razor blade. The film was submerged in 40% aqueous zirconyl chloride for 15 min, rinsed with water, and dried.

Film 13B: To 30 g of a 3.5% solution of pectin in water was added 0.01 g of polyethyleneimine (PEI) with vigorous stirring. A film was prepared by casting the solution onto a Pyrex® glass plate using a 50 mil (1.27 mm), 4"-square doctor knife and drying at room temperature overnight. The film was heated to 150 C. for 2 min. The 1 mil (25 microns) thick dried film was removed from the glass plate by raising the edges with a sharp razor blade. The film was submerged in 40% aqueous zirconyl chloride for 15 min, rinsed with water, and dried.

Film 13C: 0.35 g of glucose and 7.2 g of pectin were dissolved in 113 g of water with vigorous stirring. The solution was allowed to stand overnight to eliminate bubbles. A film was cast in a manner identical to that described for film 13A. The film was submerged in 40% aqueous zirconyl chloride for 5 min, rinsed with water, and dried.

Film 13D: To 30 g of a 3.5% solution of pectin in water were added 10 μL of 80% aqueous tetrakis(hydroxymethyl) phosphine chloride (TK) flame retardant with vigorous stirring. A film was cast in a manner identical to that described for film 13A. The film was submerged in 40% aqueous zirconyl chloride for 15 min, rinsed with water, and dried.

MVTR and DMMP measurements for Films 13A-D were made using a Nomex® overlayer.

TABLE 10

Data for pectin films containing additives

| Sample | Additive | Thickness (mil (μm)) | MVTR (kg/m$^2$/24 h) | Ave. DMMP (μg in 17 h) | DMMP values (μg in 17 h) |
|---|---|---|---|---|---|
| 13A | Glyoxylic acid | 1.0 (25) | 26.0 | 0 | 0, 0, 0 |
| 13B | PEI | 1.0 (25) | 30.8 | 21 | 75, 0, 0, 30, 0 |
| 13C | Glucose | 1.0 (25) | 18.7 | 13 | 0, 0, 0, 0, 67 |
| 13D | TK | 1.0 (25) | 26.0 | 0 | 0, 0, 0 |

Example 14

A 1 mil (25 μm) thick alginate film that is ionically crosslinked using BaCl$_2$ is prepared as in Example 2. It is heat laminated to the polyurethane side of a preformed laminate consisting of a nylon-cotton blend fabric, a dot-matrix pattern of polyurethane melt adhesive, and a 9 μm thick polyurethane film. The MVTR of the resulting laminate is satisfactory, and no detectable DMMP permeation is observed after 17 h.

Example 15

Two laminate structures, 15A and 15B, are prepared as follows:

15A: Nomex® pajamacheck fabric is bonded to monolithic polyurethane (PU) film (5-10 μm thick) with polyurethane adhesive dots (25% coverage).

15B: Nomex® knit fabric is bonded to polyurethane (PU) film (5-10 μm thick) with polyurethane adhesive dots (25% coverage).

A 1 mil (25 μm) thick alginate film that is ionically crosslinked using BaCl$_2$ is prepared as in Example 2. The film is heat laminated between laminate structures 15A and 15B, with the PU film facing the alginate film in each case. These samples, with laminate 15A oriented upwards, are then overlaid with an outer shell of ripstop polybenzimidazole ("PBI")/para-aramid fiber blend (available from Southern Mills, Inc. under the Gemini trademark).

Samples cut from the resulting structure all pass the NFPA 1994, 2006 Revision requirements of <4.0 μg/cm$^2$ one hour cumulative permeation for sulfur mustard [S(CH$_2$CH$_2$Cl)$_2$] and <1.25 μg/cm$^2$ for the nerve agent Soman. The MVTR for each sample is at least 2 kg/m$^2$/24 h.

What is claimed is:

1. A selectively permeable protective structure comprising a water-insoluble continuous film that contains at least one acid polysaccharide moiety in the amount of at least 50% by weight, wherein the at least one acid polysaccharide moiety comprises one or more glycosaminoglycans selected from the group consisting of hyaluronic acid, chondroitin-4-sulfate, chondroitin-6-sulfate, dermatan sulfate, keratin sulfate, heparin; and alkali salts, alkaline earth salts, and (alkyl)ammonium salts of said glycosaminoglycans; and at least one layer of fabric.

2. A selectively permeable structure comprising a water-insoluble continuous film that contains at least one acid polysaccharide moiety in the amount of at least 50% by weight, wherein the acid polysaccharide is a polysaccharide that contains acidic functional groups that are ionizable or a salt of such a polysaccharide; and at least one layer of fabric, wherein the acid polysaccharide film further comprises one or more members selected from the group consisting of natural polymers, synthetic polymers, crosslinking agents, fillers, flame retardants, plasticizers, tougheners, and stabilizers, and wherein the film comprises at least 50% acid polysaccharide by weight.

3. The selectively permeable structure according to claim 2 further comprising a substrate onto which the acid polysaccharide film is cast from solution, wherein the substrate is essentially without protrusions above the plane of the substrate that are higher than the desired thickness of the coating of acid polysaccharide that will be transformed into the film.

4. The selectively permeable structure according to claim 3 wherein the substrate is selected from the group consisting of films, sheets, and microporous membranes.

5. The selectively permeable structure according to claim 3 wherein the substrate is a film, sheet, or microporous membrane and comprises at least one polymer selected from the group consisting of elastomers, glassy polymers, and semicrystalline materials.

6. The selectively permeable structure according to claim 5 wherein the at least one polymer is selected from the group consisting of ionomers, polyolefins, and fluoropolymers.

7. The selectively permeable structure according to claim 6 wherein the ionomer is selected from the group consisting of ionomers of ethylene/acrylic acid copolymers or ethylene/methacrylic acid copolymers; perfluorinated sulfonate or carboxylate polymers; sulfonated polystyrenes; sulfonated ethylene-propylene terpolymers; sulfonated styrene-polyolefin di- and tri-block copolymers; sulfonated polyesters; and sulfonated polyamides.

8. The selectively permeable structure according to claim 7 wherein the perfluorinated sulfonate polymer is a perfluorosulfonic acid tetrafluoroethylene copolymer.

9. The selectively permeable structure according to claim 6 wherein the polyolefin is selected from the group consisting of: polypropylene; high density polyethylene, low density polyethylene, linear low density polyethylene, metallocene-catalyzed polyethylene, very low density polyethylene, ultra-high molecular weight polyethylene, high performance polyethylene; copolymers of ethylene and propylene; copolymers derived from ethylene or propylene and at least one monomer selected from propylene, methyl acrylate, ethyl acrylate, n-butyl acrylate, methyl methacrylate, acrylic acid, methacrylic acid and carbon monoxide; and copolymers of olefins with at least one diolefin.

10. The selectively permeable structure according to claim 9 wherein the copolymer with a diolefin is selected from the group consisting of copolymers of ethylene, or of propylene, or of ethylene and other olefins, with: linear aliphatic nonconjugated dienes of at least six carbon and other dienes, conjugated or not, such as norbornadiene, dicyclopentadiene, ethylidene norbornene, and butadiene.

11. The selectively permeable structure according to claim 6 wherein the fluoropolymer is selected from the group consisting of polymers and copolymers of trifluoroethylene, hexafluoropropylene, monochlorotrifluoroethylene, dichlorodifluoroethylene, tetrafluoroethylene, vinylidene fluoride, and vinyl fluoride.

12. The selectively permeable structure according to claim 11 wherein the fluoropolymer is selected from the group consisting of fluorinated ethylene/propylene copolymers, copolymers of ethylene and chlorotrifluoroethylene, copolymers of ethylene and tetrafluoroethylene, perfluorovinyl ether/tetrafluoroethylene copolymers, vinylidene fluoride/hexafluoropropylene copolymers, vinylidene fluoride/perfluoro (alkyl vinyl ether) dipolymers and terpolymers with tetrafluoroethylene, polyvinylidene fluoride homopolymer or a blend of polyvinylidene fluoride with an acrylic polymer, and polyvinyl fluoride homopolymer.

13. The selectively permeable structure according to claim 5 wherein the substrate is a hydrophobic microporous membrane.

14. The selectively permeable structure according to claim 2 wherein the fabric is a woven or nonwoven fabric that comprises one or more members selected from the group consisting of aramid, polybenzimidazole, nylon, and cotton.

15. The selectively permeable structure according to claim 2 wherein the Moisture Vapor Transport Rate is at least 2 kg/m$^2$/24 h and the transport rate of at least one chemical or biological agent harmful to human health is low enough to prevent the occurrence of injury, illness or death caused by said chemical or biological agent.

16. The selectively permeable structure according to claim 15 wherein the chemical or biological agent is selected from the group consisting of nerve agents, vesicant agents, Lewisites, nitrogen mustards, tear gases and riot control agents, toxic industrial chemicals and toxic industrial materials, pesticides, phosgene, chlorine, parathion, acrylonitrile, viruses, bacteria, and toxins.

17. The selectively permeable structure according to claim 2 wherein the acid polysaccharide film further comprises a natural polymer selected from the group consisting of chitosan itself, chitosan salts, and chitosan derivatives.

18. A process for fabricating a selectively permeable laminate, comprising:
(a) forming a solution of an acid polysaccharide,
(b) depositing a quantity of the acid polysaccharide solution sufficient to form a film on a substrate, wherein the substrate is essentially without protrusions above the plane of the substrate that are higher than the desired thickness of the coating of acid polysaccharide that will be transformed into the film;
(c) drying the deposited acid polysaccharide solution on the substrate, thereby forming an acid polysaccharide film;
(d) optionally, depositing an additional layer onto the acid polysaccharide film; and
(e) forming a laminate comprising the substrate and the acid polysaccharide film and at least one layer of fabric.

19. A process for fabricating a selectively permeable laminate, comprising:
(a) forming a solution of an acid polysaccharide;
(b) depositing on a work device a quantity of such solution sufficient to form a film;
(c) drying the deposit of acid polysaccharide solution on the work device, thereby forming an acid polysaccharide film;
(d) optionally, depositing an additional layer onto the acid polysaccharide film;
(e) removing the film from the work device; and
(f) forming a laminate comprising the film and at least one layer of fabric.

20. The process according to claim 18 or 19 wherein the substrate is selected from the group consisting of films, sheets, and microporous membranes.

21. The process according to claim 18 or 19 further comprising insolubilizing the continuous film by one or more methods selected from the group consisting of heating; ionic crosslinking by means of immersion of the film in a solution of at least one divalent or trivalent salt; covalent crosslinking; and contacting with an acid with a pKa that is lower than the pKa of the acid polysaccharide to be insolubilized.

22. The process according to claim 21 comprising insolubilizing the continuous film by ionic crosslinking by means of immersion of the film in a solution of a divalent or trivalent salt selected from the group consisting of $CaCl_2$, $SrCl_2$, $BaCl_2$, $ZrOCl_2$, and $FeCl_3$.

23. The process according to claim 18 or 19 wherein the concentration of acid polysaccharide in the acid polysaccharide solution (a) is from about 0.5 to about 15 wt %.

24. The process according to claim 18 or 19 wherein the acid polysaccharide solution is deposited onto the work device using doctor knife coating, spray coating, dip coating, or spin coating; or is applied to a traveling web or substrate using a reverse roll, wire-wound or Mayer rod, direct and offset gravure, slot die, blade, hot melt, curtain, knife over roll, extrusion, air knife, spray, rotary screen, multilayer slide, coextrusion, meniscus, comma or microgravure coating method.

25. The process according to claim 18 or 19 wherein the solution of acid polysaccharide further comprises any one or more members selected from the group consisting of natural polymers, synthetic polymers, crosslinking agents, fillers, flame retardants, plasticizers, tougheners, and stabilizers and wherein at least 50% of the resulting film by weight is acid polysaccharide.

* * * * *